Nov. 29, 1960   R. M. LANDSMAN   2,962,217
SYSTEM OF PRODUCING CURVE FROM PULSE DATA
Filed Oct. 6, 1958

R.M. LANDSMAN
INVENTOR.

BY *E.R. Hyde Jr.*
ATTORNEY

United States Patent Office 2,962,217
Patented Nov. 29, 1960

2,962,217

SYSTEM OF PRODUCING CURVE FROM PULSE DATA

Robert M. Landsman, Norwalk, Conn., assignor to The Perkin-Elmer Corporation, Norwalk, Conn., a corporation of New York Filed Oct. 6, 1958, Ser. No. 765,435

3 Claims. (Cl. 235—197)

The present invention relates in general to a system for obtaining a series of straight line approximations of given data. More particularly the invention concerns a system for receiving periodic analog pulses and converting them to a continuous line graphic representation wherein the time delay of the output function is dependent upon a predetermined sampling frequency rather than upon the frequency of the input function as in prior systems.

This invention finds wide use and utility in various installations and applications. One such use would be in a telemetering system wherein a particular quantity is periodically measured and analog pulses of varying amplitudes representing the quantity are produced. It may be that a plurality of quantities are periodically measured and transmitted to a receiving point as analog pulses on a time division basis. It is readily understood that an observer might desire to check the history and trend of a particular measured quantity at a quick glance. Accordingly, a corresponding curve or continuous line graph of the varying function would be of considerable use. It is to this general problem that the present invention is directed.

Accordingly, a primary object of the present invention is to provide a system for converting pulses to a continuous line graphic representation.

Another object of the present invention is to provide a voltage which varies as a function of received analog pulses.

Another object of the present invention is to provide a method of producing a continuous curve from received periodic pulses.

In accordance with these and other objects, the present invention contemplates a novel system adapted to receive analog pulses and produce a continuous voltage output representative of the best straight line fit for the amplitudes of adjacent pulses. An electronic subtractor or summing circuit receives the input pulses and is also connected to a feed-back line from the output whereby each input pulse is subtracted from an integrated output of the respective preceding difference pulse. The subtractor circuit may be of conventional design and produces an output that is substantially equal to the amplitude of each pulse minus the amplitude of the preceding pulse. This difference voltage, appearing at the subtractor output is passed through a switching element which operates in timed relation to the frequency of the incoming data pulses. Thus it is seen that a step function is obtained wherein each step is apporximately equal to the amplitude of a pulse minus the amplitude of the preceding pulse. The increments of the step function are passed to a storage circuit and then to an integrator. The output of the integrator is a continually varying voltage which is a series of straight line approximations of the curve of the input pulses. This voltage is then connected to a visual indicating device such as a cathode ray oscilloscope. The integrated output is also fed back to the subtractor circuit to be subtracted from the next succeeding input pulse. This cycle is repeated and there is thereby obtained a series of straight line approximations of the received data.

The invention will be more fully understood from the following description of a specific embodiment thereof taken with the drawings in which.

Figure 1:
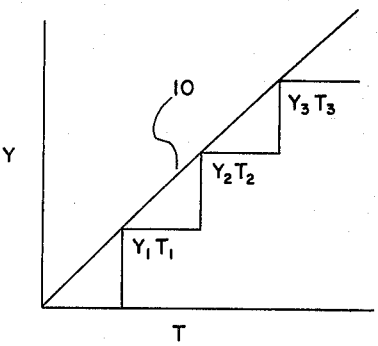
Fig. 1 is a curve illustrating the principles of the present invention.

Referring now to the drawing and more particularly to Fig. 1, there is shown a curve $f(t)$ defined by a series of analog pulses represented by the points $y_1t_1$; $y_2t_2$; $y_3t_3$. It is understood that it is desired to produce the series of straight lines joining these points which is represented by the line 10. From the figure it can be seen that $$y_2 = y_1 + \int_{t_1}^{t_2} \frac{y_2 - y_1}{t_2 - t_1} \Delta t \qquad \Delta t = (t_2 - t_1)$$

$$= y_1 + \frac{y_2 - y_1}{t_2 - t_1} \int (t_1 - t_2)$$

As will become apparent from the following description of the system, the present invention operates to solve this formula.

Figure 2:
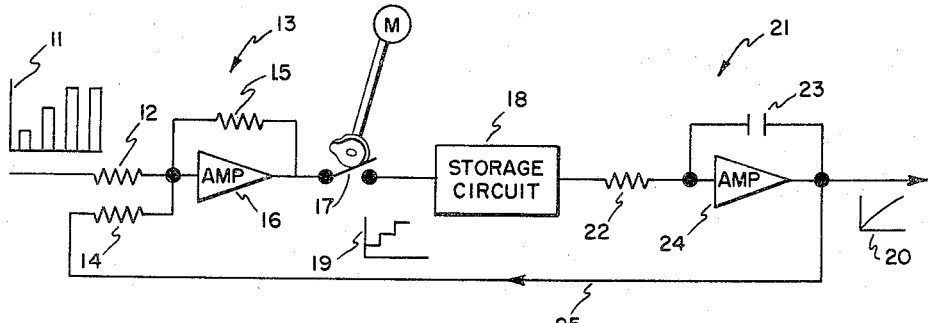
Fig. 2 is a schematic diagram of the system of the present invention.

Referring now to Fig. 2, a series of analog pulses such as 11 are fed to resistor 12 of a subtractor circuit generally indicated by numeral 13. Consider, for example, the particular time that pulse $y_2$ is received, the preceding pulse $y_1$ is being applied to resistor 14 as will become apparent hereinafter. The difference between these pulses is provided and will appear at the output of the subtractor 13. Resistor 12 and 14 connect to the parallel combination of resistor 15 and a high gain amplifier 16. The difference voltage is passed through a periodically operated timing switch 17 to a storage circuit 18 which may be of any conventional design such as a capacitor. The timing switch may take any convenient form such as a cam operated or electronic switch and is actuated in synchronization with the input pulses and in phase with the leading edge of each sampling pulse. The switch is closed for a short interval relative to the sampling rate. It is seen then that the storage circuit receives a step function as shown at 19. The difference between the successive pulses $y_2$ and $y_1$ is then passed to an integrator generally indicated by numeral 21 which comprises a resistor 22, capacitor 23 and amplifier 24 as shown. Thus as the timing switch 17 closes and then opens the difference $y_2 - v_1$ is applied to the integrator and a potential will build up across capacitor 23 in accordance with the time constant of resistor 22 and the capacitor. This time constant may be equal to the time interval between successive sampling pulses. It is this time constant in conjunction with the sampling rate that determines the delay between the input and output function. The output of the integrator is then passed to a recording device which will provide a visual indication of the straight line between the points $y_1t_1$ and $y_2t_2$.

The output of the integrator is also fed back by line 25 to the input resistor 14 of the subtractor. Thus, the next succeeding pulse $y_3$ will be subtracted by the output of the preceding cycle.

The above described cycle will, of course, repeat and a series of straight line approximations of the curve defined by the pulses $y_1$, $y_2$, $y_3$, etc. will be obtained.

Although the present invention has been described with respect to a specific embodiment, thereof, it is understood that this is not to be considered as limiting the scope of the invention as defined in the following claims.

I claim:

1. A system of the character described comprising a subtractor circuit having an input side adapted to receive periodic pulses, switch means connected to the output of said subtractor circuit, means to actuate said switch means in synchronization with said periodic pulses, storage means connected to said switch means, integrator means connected to said storage means, means connecting the output of said integrator means to the input of said subtractor circuit whereby the output of said subtractor is the difference between a respective input pulse and the integrated output of the preceding pulse.

2. A system of the character described comprising an electronic subtractor circuit having an input side adapted to receive periodic pulses, switch means connected to the output of said subtractor circuit, means to actuate said switch means in synchronization with said periodic pulses whereby a step function is produced, storage means connected to said switch means, integrator means connected to said storage means, means connecting the output of said integrator means to the input of said subtractor circuit whereby the output of said integrator is a continuous voltage substantially representing the curve of the received periodic pulses.

3. A system of the character described comprising an electronic subtractor circuit having an input side adapted to receive periodic analog pulses, switch means connected to the output of said subtractor circuit, means to actuate said switch means in synchronization with said periodic analog pulses whereby a step function is produced, storage means connected to said switch means, integrator means including an RC circuit connected to said storage means, the time constant of said RC circuit approximating the period of the received analog pulses, means connecting the output of said integrator means to the input of said subtractor circuit whereby the output of said integrator is a continuous voltage substantially representing the straight line approximations between the received periodic pulses.

References Cited in the file of this patent

"Electronic Analog Computers" (Korn and Korn), published by McGraw-Hill Book Company, Inc., New York, 1952. Pages 223 and 293 relied on.